March 29, 1938.  G. D. RENNE  2,112,708
OIL BURNING GRIDDLE
Filed April 27, 1937
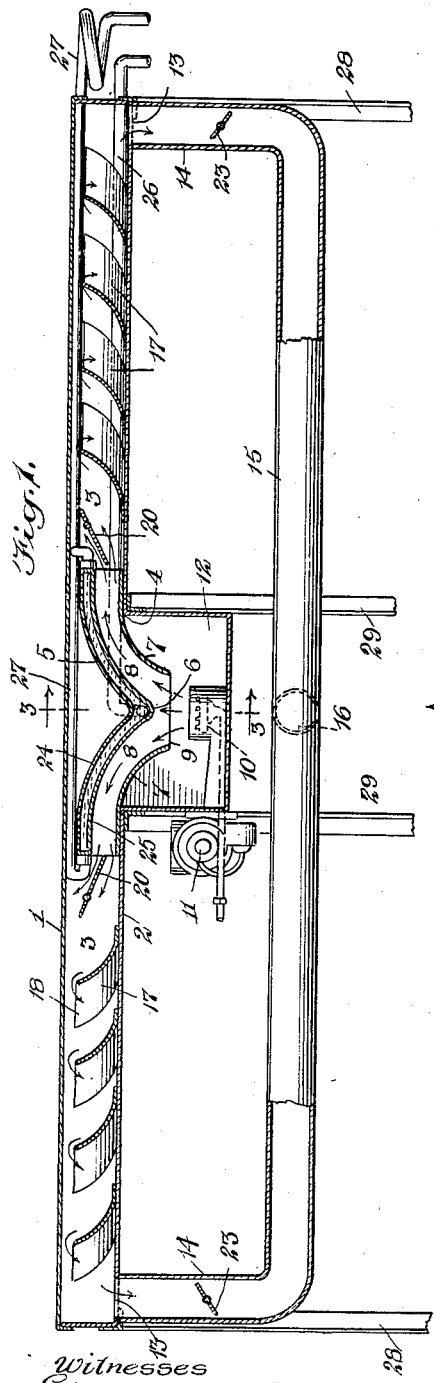
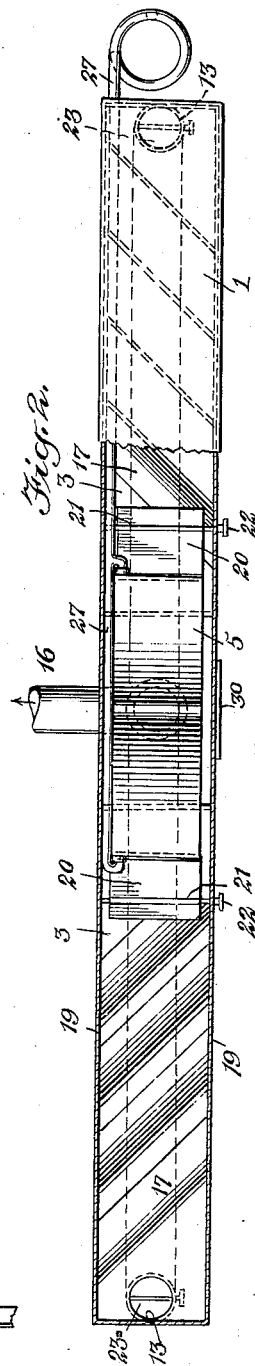
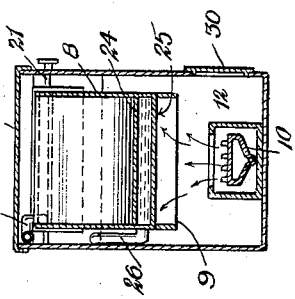
INVENTOR
George D. Renne
BY
ATTORNEYS Patented Mar. 29, 1938

2,112,708

UNITED STATES PATENT OFFICE 2,112,708

OIL BURNING GRIDDLE

George D. Renne, Hicksville, N. Y.

Application April 27, 1937, Serial No. 139,153

2 Claims. (Cl. 126—44)

The present invention relates to an oil burning griddle and has for its object to provide a simple form of griddle having a heat chamber enclosed between top and bottom plates with an opening in the bottom plate beneath which is positioned an oil burner with means in the chamber for controlling the passage of and proper distribution of the products of combustion therein, and a further object is to provide such a griddle with a flaring deflector having means to heat and circulate water so that it may be received and heated therein and discharged therefrom, thus providing a constant supply of hot water.

The invention is shown in the accompanying drawing in which—

Fig. 1 shows a longitudinal sectional view in which some of the parts are shown in elevation;

Fig. 2 shows a top plan view with the top plate broken away to show the underlying construction;

Fig. 3 shows a vertical section taken on the line 3—3 in Fig. 1 looking in the direction of the arrows on that line.

The device consists of an elongated rectangular casing made of any suitable metal and comprising a top plate 1 and a bottom plate 2 spaced apart a sufficient distance and connected at their marginal edges to provide a chamber 3. The top plate 1 has a smooth upper surface upon which various forms of food may be placed and also various cooking utensils may be supported thereon. The bottom plate 2 is provided with an opening 4 over which is supported a diverging deflector 5. The deflector 5 extends upward and laterally by side and end walls in opposite directions into the chamber 3 from its central ridge 6. The deflector 5 also comprises curved walls 7 which form flues or channels 8 which surround an opening 9 through which the heated gases or products of combustion from the oil burner 10 pass laterally in opposite directions along the chamber 3.

Any suitable oil burner 10 may be employed but preferably it will be a burner provided with a blower 11 or other suitable means to cooperate with the burner and to mix with the products of combustion sufficient air to form a gas which may be ignited as usual in such burners.

Preferably below the central opening 4 there will be a closed box-like casing 12 in which the burner 10 is placed and supported and which protects the flame from the atmosphere as the blower forces the products of combustion through the opening 9 of the deflector and guided in opposite directions along the chamber 3 as indicated by the arrows in Fig. 1.

The under plate 2 of the casing or chamber 3 at its opposite ends will be provided with discharge openings 13 leading into conduits 14 and a connecting conduit 15 which will be provided with a discharge flue 16. Within the chamber 3 are upwardly curved deflecting baffles 17, the lower edges of which are supported upon the bottom plate 12. The baffles 17 will preferably be slightly curved as shown with their upper edges 18 closely adjacent to but positioned below the under surface of the plate 1. The baffles 17 will extend diagonally across the chamber as indicated in Fig. 2, and they will be in close contact with the side walls 19 of the chamber so that the hot gases passing through the chamber 3 will be deflected upwardly towards the under surface of the top plate 1 as indicated by the arrows shown in Fig. 1. Preferably the baffles or deflectors 17 will be inclined in opposite directions at opposite ends of the chamber 3.

Positioned on opposite sides of the deflector 5 are dampers or deflectors 20 mounted on shafts 21, the shafts having operating heads 22 projecting through the front wall 19 so that the shafts 21 may be turned and thus change the angular position of the pivoted dampers or deflectors 20 to either cut off the heat supply entirely at one side of the deflector 5 or to modify and control the volume of heat permitted to pass through the chamber. By this arrangement one end of the chamber may be supplied with more heat than the opposite end.

In the sections 14 of the conduit there will be similar pivoted dampers or deflectors 23 to control the passage of heated gases therethrough and to the discharge flue 16 where the products of combustion will be discharged.

As shown the deflector 5 will be provided with double walls 24 and 25 forming a water chamber into which a supply of water may be directed through the piping 26 which leads into the deflector at or near its ridge at which point it will be heated and thence discharged through the piping 27.

It will be understood of course that the ends of the piping project through the wall of the casing 3 at one end thereof and will be connected with a water supply and with a boiler or container or other suitable device to receive the heated water.

The griddle is supported by standards 28 at the opposite ends and intermediate standards 29. The standards 28 and 29 may be made of any suitable material such as angle iron.

At the front of the chamber 12 a door 30 permits access to the burner when required.

It is thought that the operation of the griddle has been sufficiently disclosed in connection with the foregoing description of its construction, and that further description of the operation will be deemed unnecessary.

I claim:

1. An oil burning griddle comprising an elongated rectangular chamber having parallel top and bottom plates, an opening in the bottom plate, an oil burner located beneath said opening, a double wall flaring deflector supported within said chamber over said opening with its ridge line centrally projecting into said opening to distribute the products of combustion in opposite directions along said chamber, baffle plates supported in said chamber upon opposite sides of the flaring deflector with their upper edges below the under surface of the top plate, discharge outlets at each end of said chamber and conduits leading therefrom to remove the gases from the chamber.

2. An oil burning griddle comprising an elongated chamber having parallel top and bottom plates, an opening in the bottom plate, an oil burner located beneath said opening, a double flaring deflector supported within said chamber over said opening with its ridge line centrally projecting into said opening, diverging conduits beneath said flaring deflector to receive the gases from the oil burner, curved baffles mounted within the chamber with their upper edges spaced from the top plate, outlets at opposite ends of the chamber, and discharge conduits leading therefrom to the atmosphere.

GEORGE D. RENNE.